US010628002B1

(12) United States Patent
Kang et al.

(10) Patent No.: US 10,628,002 B1
(45) Date of Patent: Apr. 21, 2020

(54) INTEGRATED DATA AUTHENTICATION SYSTEM WITH AN INTERACTIVE USER INTERFACE

(71) Applicant: Palantir Technologies Inc., Palo Alto, CA (US)

(72) Inventors: Christina Kang, Portola Valley, CA (US); Kellen Donohue, Seattle, WA (US); Lindsey Bergh, Harwich, MA (US); Paige Pauli, Palo Alto, CA (US); Yiying Li, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 237 days.

(21) Appl. No.: 15/900,292

(22) Filed: Feb. 20, 2018

Related U.S. Application Data

(60) Provisional application No. 62/530,389, filed on Jul. 10, 2017.

(51) Int. Cl.
| | | |
|---|---|---|
| *G06F 3/0484* | (2013.01) | |
| *G06F 3/0481* | (2013.01) | |
| *G06F 16/335* | (2019.01) | |

(52) U.S. Cl.
CPC .......... *G06F 3/0484* (2013.01); *G06F 3/0481* (2013.01); *G06F 16/335* (2019.01)

(58) Field of Classification Search
CPC . H04M 1/274525; H04M 1/66; G06F 3/0482; G06F 16/2428; G06F 3/0488; G06Q 10/06311; G06Q 10/06
See application file for complete search history.

(56) References Cited

U.S. PATENT DOCUMENTS

| | | |
|---|---|---|
| 5,893,072 A | 4/1999 | Zizzamia |
| 6,232,971 B1 | 5/2001 | Haynes |
| (Continued) | | |

FOREIGN PATENT DOCUMENTS

| | | |
|---|---|---|
| DE | 102014103476 | 9/2014 |
| EP | 2980748 | 2/2016 |
| (Continued) | | |

OTHER PUBLICATIONS

Definition "Identify", downloaded Jan. 22, 2015, 1 page.
(Continued)

*Primary Examiner* — Toan H Vu
(74) *Attorney, Agent, or Firm* — Knobbe Martens Olson & Bear LLP

(57) ABSTRACT

Systems and methods for generating an interactive user interface data for validating one or more contacts and/or updating actions for an individual. In some embodiments, an interactive user interface can be generated including a first portion including a selectable list of primary contact information items associated with the individual and a second portion including a selectable list of secondary contact information items associated with the individual. After receiving a first user input in the second portion selecting a secondary contact information item, the interactive user interface can be updated to receive further user inputs, such as a new primary contact information item. The interactive user interface can then be updated to include the new primary contact information item in the first portion.

20 Claims, 7 Drawing Sheets

(56) References Cited

U.S. PATENT DOCUMENTS

| | | |
|---|---|---|
| 6,505,196 B2 | 1/2003 | Drucker et al. |
| 6,523,019 B1 | 2/2003 | Borthwick |
| 7,383,239 B2 | 6/2008 | Bonissone |
| 7,418,431 B1 | 8/2008 | Nies et al. |
| 7,765,489 B1 | 7/2010 | Shah |
| 7,813,937 B1 | 10/2010 | Pathria et al. |
| 7,827,045 B2 | 11/2010 | Madill et al. |
| 7,966,199 B1 | 6/2011 | Frasher |
| 8,214,232 B2 | 7/2012 | Tyler et al. |
| 8,301,464 B1 | 10/2012 | Cave et al. |
| 8,489,623 B2 | 7/2013 | Jain et al. |
| 8,515,912 B2 | 8/2013 | Garrod et al. |
| 8,527,461 B2 | 9/2013 | Ducott, III et al. |
| 8,578,500 B2 | 11/2013 | Long |
| 8,639,522 B2 | 1/2014 | Pathria et al. |
| 8,655,687 B2 | 2/2014 | Zizzamia |
| 8,682,696 B1 | 3/2014 | Shanmugam |
| 8,799,313 B2 | 8/2014 | Satlow |
| 2003/0036927 A1 | 2/2003 | Bowen |
| 2003/0163352 A1 | 8/2003 | Surpin et al. |
| 2004/0126840 A1 | 7/2004 | Cheng et al. |
| 2005/0028094 A1 | 2/2005 | Allyn |
| 2005/0108063 A1 | 5/2005 | Madill et al. |
| 2005/0125715 A1 | 6/2005 | Di Franco et al. |
| 2005/0149527 A1 | 7/2005 | Berlin |
| 2005/0182654 A1 | 8/2005 | Abolfathi et al. |
| 2006/0080139 A1 | 4/2006 | Mainzer |
| 2006/0129746 A1 | 6/2006 | Porter |
| 2006/0142949 A1 | 6/2006 | Helt |
| 2006/0149596 A1 | 7/2006 | Surpin et al. |
| 2006/0178915 A1 | 8/2006 | Chao |
| 2006/0241974 A1 | 10/2006 | Chao et al. |
| 2007/0136095 A1 | 6/2007 | Weinstein |
| 2007/0192143 A1 | 8/2007 | Krishnan et al. |
| 2007/0247435 A1* | 10/2007 | Benko .................. G06F 3/0488 345/173 |
| 2007/0299697 A1 | 12/2007 | Friedlander et al. |
| 2008/0155440 A1 | 6/2008 | Trevor et al. |
| 2008/0172257 A1 | 7/2008 | Bisker et al. |
| 2008/0195417 A1 | 8/2008 | Surpin et al. |
| 2008/0195421 A1 | 8/2008 | Ludwig et al. |
| 2008/0201196 A1* | 8/2008 | Rowland .......... G06Q 10/06311 705/7.13 |
| 2008/0235199 A1 | 9/2008 | Li et al. |
| 2008/0249820 A1 | 10/2008 | Pathria |
| 2008/0281819 A1 | 11/2008 | Tenenbaum et al. |
| 2009/0043801 A1 | 2/2009 | LeClair |
| 2009/0070162 A1 | 3/2009 | Leonelli et al. |
| 2009/0216562 A1 | 8/2009 | Faulkner et al. |
| 2009/0240529 A1 | 9/2009 | Chess et al. |
| 2009/0280777 A1* | 11/2009 | Doherty .................. H04M 1/66 455/411 |
| 2009/0281839 A1 | 11/2009 | Lynn et al. |
| 2010/0280851 A1 | 11/2010 | Merkin |
| 2010/0299348 A1* | 11/2010 | Gill ..................... G06F 16/2428 707/769 |
| 2010/0324929 A1 | 12/2010 | Petrasich et al. |
| 2011/0161409 A1 | 6/2011 | Nair |
| 2011/0179048 A1 | 7/2011 | Satlow |
| 2011/0216095 A1* | 9/2011 | Rydenhag ............. G06F 3/0482 345/676 |
| 2011/0246229 A1 | 10/2011 | Pacha |
| 2012/0004894 A1 | 1/2012 | Butler |
| 2012/0052848 A1* | 3/2012 | Kim ................ H04M 1/274525 455/414.1 |
| 2012/0065987 A1 | 3/2012 | Farooq et al. |
| 2012/0084184 A1 | 4/2012 | Raleigh |
| 2012/0197657 A1 | 8/2012 | Prodanovic |
| 2012/0197660 A1 | 8/2012 | Prodanovic |
| 2012/0310661 A1 | 12/2012 | Greene |
| 2013/0006655 A1 | 1/2013 | Van Arkel et al. |
| 2013/0006668 A1 | 1/2013 | Van Arkel et al. |
| 2013/0276799 A1 | 10/2013 | Davidson |
| 2014/0052466 A1 | 2/2014 | DeVille et al. |
| 2014/0058754 A1 | 2/2014 | Wild |
| 2014/0059498 A1* | 2/2014 | McCormack .......... G06Q 10/06 715/854 |
| 2014/0081652 A1 | 3/2014 | Klindworth |
| 2014/0136237 A1 | 5/2014 | Anderson et al. |
| 2014/0149130 A1 | 5/2014 | Getchius |
| 2014/0214579 A1 | 7/2014 | Shen et al. |
| 2014/0244284 A1 | 8/2014 | Smith |
| 2015/0186821 A1 | 7/2015 | Wang et al. |
| 2015/0187036 A1 | 7/2015 | Wang et al. |
| 2015/0235334 A1 | 8/2015 | Wang et al. |

FOREIGN PATENT DOCUMENTS

| | | |
|---|---|---|
| GB | 2514239 | 11/2014 |
| WO | WO 2008/113059 | 9/2008 |
| WO | WO 2010/030913 | 3/2010 |

OTHER PUBLICATIONS

Definition "Overlay", downloaded Jan. 22, 2015, 1 page.
Madden, Tom, "Chapter 16: The BLAST Sequence Analysis Tool," The NCBI Handbook, Oct. 2002, pp. 1-15.

* cited by examiner

Contact Form

Call Notes

*Add your notes about this call*

○ Select the action item you want to address on your call    Select all

Action Items

Category 1
[☑] Action 1 — 404

Category 2
[☐] Action 2 — 406

401

402

[Cancel] [Next] — 408

Contact Form

Call Notes

*Add your notes about this call*

○ Place your call: (345) 567-8901 — 422    Select all

Call status
[Select... ▽] — 424
Number notes
[Number notes] — 426

▷ Schedule a follow-up call — 427

[Cancel] [Save] — 428

INTEGRATED DATA AUTHENTICATION SYSTEM WITH AN INTERACTIVE USER INTERFACE

CROSS-REFERENCE TO RELATED APPLICATIONS

This application claims benefit of U.S. Provisional Patent Application No. 62/530,389, filed Jul. 10, 2017, and titled "INTEGRATED DATA AUTHENTICATION SYSTEM WITH AN INTERACTIVE USER INTERFACE". The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to systems and techniques for contact and action data integration, analysis, and visualization. More specifically, systems and methods are disclosed that facilitate calculation and presentation of data validation for individuals. Furthermore, systems and methods are disclosed for collection and processing of individual data from various data sources.

BACKGROUND

Embodiments of the present disclosure generally relate to data processing and visualization. Member systems are available from a number of providers. Users of such systems may, for example, view member information and update member action items. Some of the systems may provide a user interface displaying such information.

SUMMARY

The systems, and methods described herein each have several aspects, no single one of which is solely responsible for its desirable attributes. Without limiting the scope of this disclosure, several non-limiting features will now be discussed briefly.

Using current available member/individual information management systems, member information in a single organization can be gathered and recorded. However, most systems cannot collect and/or process data in an efficient and comprehensive manner as the systems cannot validate data (e.g., contact information) associated with a member collected from various organizations and/or sources. Additionally, most systems do not provide an integrated platform, such as interactive user interfaces for users to view and/or process member information, such as validating member contact information, updating action items related to a member, etc.

The integrated member management system ("the system") is configured to automatically access data associated with information of a member from a plurality of data sources, convert the data to a common format, and store the converted data in a database stored in a data store. The system can also communicate with other systems to collect data. The data can include data associated with a member, such as contact information, contact history, action history and/or action items status. The member's contact information can include primary contact information, secondary contact information, etc.

Based on the data in the database, the system can generate an interactive user interface that allows a user to view and/or process member information in a more efficient and interactive way. For example, the system can update the interactive user interface to display past, current and/or future action items for a member. As a user performs an action regarding a specific action item, the system can update the member information in the database and can generate and/or update the interactive user interface to indicate such update based on user inputs. As another example, the system can generate a queue of action items to be performed by a first user and as one action item of the queue is completed by another user, the system can update the queue of the first user to indicate such change.

The system can also provide a well-defined and more efficient workflow for a user to validate the member's contact information and record such validation. For example, as a user wishes to contact a secondary contact source in order to validate a member's primary contact and/or perform a specific action, the system can first initiate a communication mechanism that allows the user to contact the secondary contact source, such as a phone device for phone calls, an email system for emails, etc. The system can also update interactive user interface for the user to input a validation result and/or a progress of the action item. The system can then update the member information in the database and automatically update the user interface to display the updated member information.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, image data (including medical images) and may enable a user to more quickly and accurately access, navigate, assess, and digest the image data than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces (to, for example, display the relevant medical images). The interactions and presentation of data via the interactive user interfaces described herein may accordingly provide cognitive and ergonomic efficiencies and advantages over previous systems.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

According to an embodiment, a computer system is disclosed. The computer system may comprise: a computer readable storage medium having embodied thereon program instructions; and one or more processors. The one or more processors are configured to execute the program instructions to cause the system to: generate user interface data configured to be rendered as an interactive user interface. The interactive user interface can include: a first graphical portion including a selectable list of primary contact information items associated with an individual and a second graphical portion including a selectable list of secondary contact information items associated with the individual. The one or more processors are further configured to execute the program instructions to cause the system to: receive a first user input via the second graphical portion of the interactive user interface selecting a secondary contact information item from the list of secondary contact information items; in response to the first user input: automatically update the interactive user interface to include a third graphical portion configured to receive a second user input including at a new primary contact information item; automatically update the primary contact information item to include a new primary contact information item; and automatically update the first graphical portion of the interactive user interface to include an indication of the secondary contact information item as a source of the new primary contact information item.

According to an embodiment, a computer-implemented method for contact authentication and generating interactive user interface is disclosed. The computer-implemented method comprises: by one or more processors executing program instructions: generating user interface data configured to be rendered as an interactive user interface including: a first graphical portion including a selectable list of primary contact information items associated with an individual; a second graphical portion including a selectable list of secondary contact information items associated with the individual. The computer-implemented method further comprises; by the one or more processors executing program instructions: receiving a first user input via the second graphical portion of the interactive user interface selecting a secondary contact information item from the list of secondary contact information items; in response to the first user input: automatically updating the interactive user interface to include a third graphical portion configured to receive a second user input including at a new primary contact information item; automatically updating the primary contact information item to include a new primary contact information item; and automatically updating the first graphical portion of the interactive user interface to include an indication of the secondary contact information item as a source of the new primary contact information item.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 3 and 4A-4D illustrate example integrated system user interfaces displaying individual information to a user.

DETAILED DESCRIPTION

Figure 1:
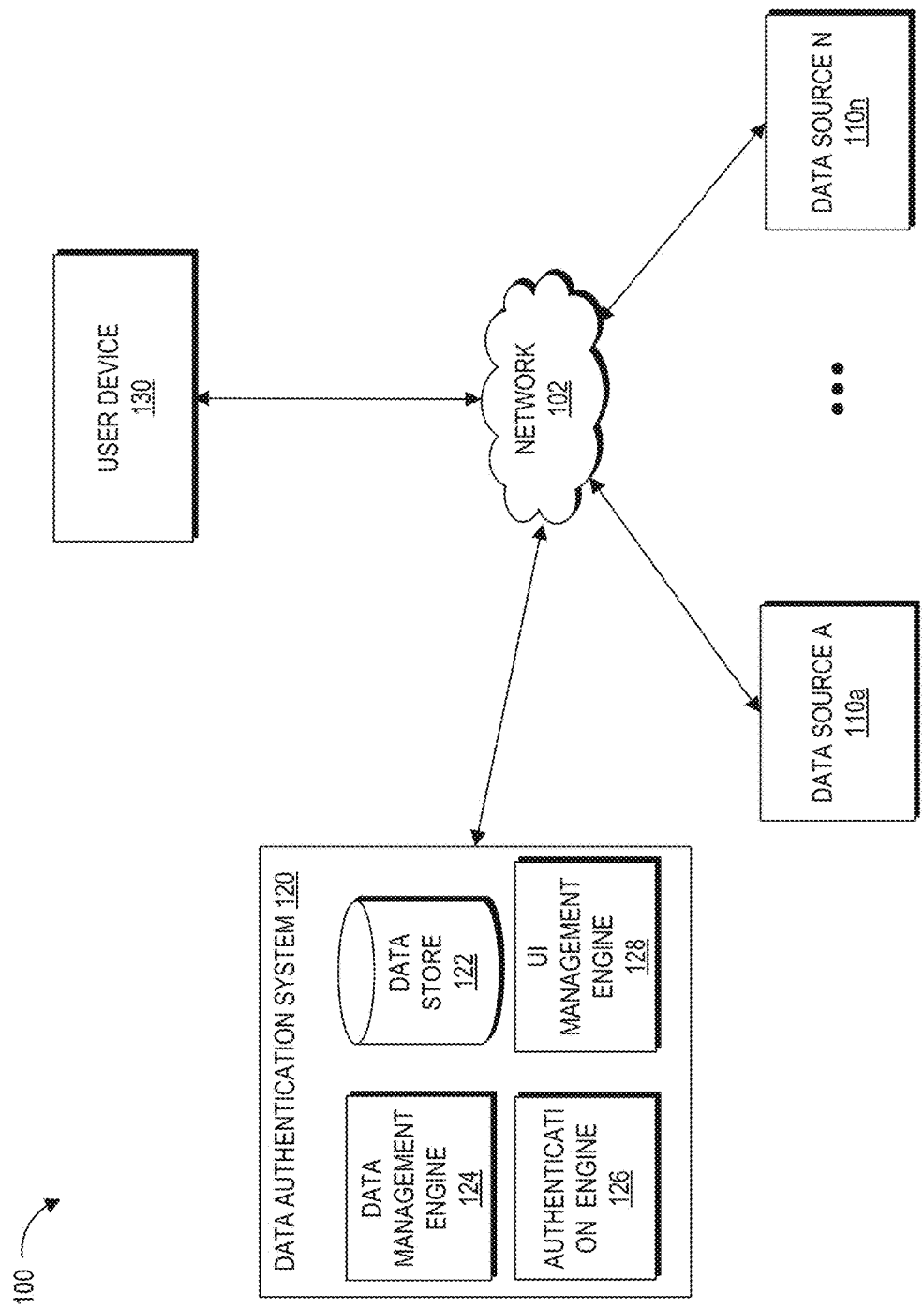
FIG. 1 is a system diagram illustrating an example integrated data authenticated system in an example operating environment, according to an embodiment of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

Using current available member/individual information management systems, member information can be gathered and recorded in a single organization. However, most systems cannot collect and/or process data in an efficient and comprehensive manner as the systems cannot validate data (e.g., contact information) associated with a member collected from various organizations and/or sources. Additionally, most systems do not provide an integrated platform, such as interactive user interfaces for users to view and/or process member information, such as validating member contact information, updating action items related to a member, etc.

The integrated member management system ("the system") is configured to automatically access data associated with information of a member from a plurality of data sources, convert the data to a common format, and store the converted data in a database stored in a data store. The system can also communicate with other systems to collect data. The data can include data associated with a member, such as contact information, contact history, action history and/or action items status. The member's contact information can include primary contact information, secondary contact information, etc.

Based on the data in the database, the system can generate an interactive user interface that allows a user to view and/or process member information in a more efficient and interactive way. For example, the system can update the interactive user interface to display past, current and/or future action items for a member. As a user performs an action regarding a specific action item, the system can update the member information in the database and can generate and/or update the interactive user interface to indicate such update based on user inputs. As another example, the system can generate a queue of action items to be performed by a first user and as one action item of the queue is completed by another user, the system can update the queue of the first user to indicate such change.

The system can also provide a well-defined and more efficient workflow for a user to validate the member's contact information and record such validation. For example, as a user wishes to contact a secondary contact source in order to validate a member's primary contact and/or perform a specific action, the system can first initiate a communication mechanism that allows the user to contact the secondary contact source, such as a phone device for phone calls, an email system for emails, etc. The system can also update interactive user interface for the user to input a validation result and/or a progress of the action item. The system can then update the member information in the database and automatically update the user interface to display the updated member information.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store/Source: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage). Data sources may include any member management application, system, etc. that can provide the system with individual information, including but not limited to: any third party management systems, any internal logs, etc.

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may combined and/or separated in any appropriate way into one or more databases, one or more tables of one or more databases, etc.

Individual: any person who belongs to one or more groups. Each individual may have one or more primary contacts and/or one or more secondary contact information items associated with the individual. Although the term "individual" is used in the present disclosure for the sake of convenience, in some implementations the system may be used in connection with other entities, e.g., groups of individuals, organizations, etc.

Action Item: any actions that are performed, or are to be performed, with regard to an individual. Such action items can be specific to a specific group. The action items can be defined by a user.

Call History Item: any contact history associated with an individual. The contact history can include phone calls, emails, in-person communications, etc. The call history may include at least one of: an action items name, a time, a date, or a source of contact (either primary contact or secondary contact), a status, etc.

Primary contact: any contact information that can be used to reach an individual. Primary contact information items includes primary contacts of the individual, such as emails, cell phone numbers, addresses, home phone numbers, office phone numbers, etc. The primary contact information items can also include any other information related to the individual's primary contacts, such as a last contact with the individual via the primary contact, a source of the primary contact, a validation status of the primary contact, etc.

Secondary contact: any contact information of a group and/or a person. The secondary contact can also be used to obtain and/or validate one or more primary contact information items of an individual. The secondary contact information items include secondary contacts of the group and/or the person, such as emails, phone numbers, addresses, office phone numbers, etc. The secondary contact information items can also include any other information related to the group and/or the person, such as an event associated with the individual and the secondary group and/or the person, a last contact the system has made with the secondary group, etc.

Example System and Network Environment

FIG. 1 is a system diagram illustrating an example integrated system in an example operating environment 100, according to an embodiment of the present disclosure. In the example of FIG. 1, the operating environment 100 includes an integrated data authentication system 120 ("the system 120"), data sources A 110a to N 110n, and user device 130. The system 120, the data sources A 110a to N 110n, and the user device 130 can communicate with each other using a network 102. In some embodiments, the system 120 can include a centralized database. The operating environment 100 can allow users to input, edit, organize, and/or compute data in the system 120 via the user device 130. The system 120 can generate one or more interactive user interfaces displaying on the user device 130. The network 102 can be a local area network, a wide area network, a peer-to-peer network, radio frequency, Bluetooth, Wi-Fi, or any other type of communication network. In some embodiments, components within the computing environment 100 can communicate with each other through various types of networks at the same time.

Example Data Authentication System

The system 120 can perform various functions in the operating environment 100, such as collecting data items associated with action items, primary contact information items and secondary contact information items of an individual from the data sources A 110a to N 110n, processing and storing the data items, generating one or more interactive user interfaces for displaying the processed data items, transmitting the one or more interactive user interfaces to the user device 130, generating and transmitting notices to the data source A 110a to N 110n, etc. The system 120 may be a part of one or more servers. The system 120 can include multiple engines performing the various functions. In the example of FIG. 1, the system 120 includes a data management engine 124, an authentication engine 126, a UI management engine 128, and a data store 122. The data store 122 can be a local data store. Alternatively, the data store 122 can be a remote data store connected to the system 120 via the network 102. In some embodiments, one or more subsystems can perform one or more of the various functions.

The data management engine 124 can communicate, exchange, or share data with other devices or systems, such as the data sources A 110a to N 110n, the user device 130, other data stores and/or applications, etc. The data management system 124 can collect data items associated with action items, primary contact information items and secondary contact information items of an individual, reformat the data items into uniform format data items, and/or store the reformatted data items, process the reformatted data items, generate and transmit notices to the data sources A 110a to N 110n, etc. The authentication engine 126 can compute the uniform format data items, initiate a communication with the individual via a primary contact and/or a secondary contact, and update action items of the individual. The UI management engine 128 can generate one or more interactive user interfaces on the user device 130, and the interactive user interfaces can display the processed data items in an interactive and illustrative way. The UI management engine 128 can also receive inputs from the user to obtain and/or validate the primary contact information items and/or to update the action items. Based at least partly on the received inputs, the system 120 can instruct the authentication engine 126 to obtain and/or update the primary and/or secondary contact information items and/or action items. The UI management engine 128 can advantageously in some embodiments update the interactive user interface on the user device 130 to display the updates.

Example Data Management Engine

In the example of FIG. 1, the system 120 includes a data management engine 124. The data management engine 124 can communicate, exchange, or share data with other devices or systems, such as the data sources A 110a to N 110n, the user device 130, other data stores and/or applications, etc. The data management system 124 can collect data items associated with action items, primary contact information items and/or secondary contact information items of an individual, reformat the data items into uniform format data items, store the reformatted data items, process the uniformed data items, and/or generate and transmit notices to the data sources A 110a to N 110n, etc.

The various data sources A 110a to N 110n may operate various different electronic applications or systems related to the individuals. In some instances, these systems may allow access through specific Application Programming Interfaces ("APIs"). Commonly, each API utilizes its own format in storing availability data items associated with an individual. Advantageously in some embodiments, the data management engine 124 can collect data items that are stored in a specific format in a specific API in the data source A 110a by forming API requests in the specific format. The API request may contain information required by the API. The data management engine 124 can then collect responses from the API, parse the responses, and translate the responses into data items in a uniform format that the system 120 can process. In collecting the data items, the data management engine 124 can form various requests for the various APIs, collect responses containing information from the APIs in the various data sources A 110a to N 110n. The data management engine 124 can store the collected information in the data store 122.

Additionally, the data management engine 124 can also parse through the collected responses and determine the data items to be translated into the uniform format. The uniform format data items can also include information associated with the API(s) and/or the data source(s) where the data items are collected from. As the responses collected from the APIs may contain information irrelevant to the system 120, such as group daily business information. Advantageously in some embodiments, the data management engine 124 can determine the types of information needed in the system 120. The data management engine 124 can compare the types of information needed in the system 120 with the data items in the responses collected and then translate the data items containing the types of information needed.

In some embodiments, the data management engine 124 can first translate the data items in the collected responses into the uniform format and then compare the uniform format data with the information needed in the system 120. If the data management engine 124 determines that more information is needed for an individual, the data management engine 124 can send requests to the API associated with the individual for more information. The data management engine 124 can then store the relevant information in the data store 122.

The data management engine 124 can create one or more databases stored in the data store 122. The one or more databases can store the uniform format data items translated from the collected information. Alternatively, the one or more databases can store the data items in the data stores 122 in their original formats. Advantageously in some embodiments, if the data sources A 110 and N 110n provide the data management engine 124 with data items in a single format, the data management engine 124 may choose not to translate the single format data items into the uniform format. The data management engine 124 can parse through the data and store the relevant data items in the one or more databases in the single format.

In some embodiments, the data management engine 124 can communicate with the data sources A 110a to N 110n periodically in order to update the one or more databases. This can advantageously improve the efficiency, accuracy, and/or speed of the system 120 as it avoids multiple requests to the same API(s) during a primary contact authentication/obtaining and/or action item update. The data management engine 124 may only need to collect updated information associated with individuals that are not stored in the one or more databases. In some embodiments, the data management engine 124 can store the collected data items in the data store 122 temporarily.

In some embodiments, the data management engine 124 can create an individual database. The individual database can store data items related to an individual, including but not limited to: profile information of the individual, a list of action items related to the individual, a list of call history items of the individual, a list of primary contact information items, and a list of secondary contact information items.

The profile information of the individual in the individual database may include a name, a location, a date of birth, an age, a gender, etc. The list of action items related to the individual in the individual database may include one or more action items, dates associated with the one or more action items, statuses associated with the one or more action item, and any other information associated with the one or more contact items. The list of call history items of the individual in the individual database may include one or more call history items, a date and/or a time of the call history item, a contact associated with the call history item, a user associated with the call history item, and any other information associated with the call history item. The list of primary contact information items in the individual database may include one or more primary contacts (e.g., name and/or contact information), secondary contact sources associated with the one or more primary contacts, call histories associated with the primary contacts, validation status of the primary contacts, and any other information associated with the one or more primary contact information items. The list of secondary contact information items in the individual database may include one or more secondary source contacts (e.g., name and/or contact information), last events associated with the secondary contacts, statuses of the secondary contacts, and any other information associated with the one or more secondary contacts. The list of secondary contact information items may include any organizations or persons that may have the individual's primary contact information items. The secondary contact may have access to the individual's primary contact information items via its daily business and/or connections with the individual.

The system 120 may have various use cases, and the data management engine 124 may adapt itself to the many use cases. For example, if the system 120 is to manage medical members, the data management engine 124 can communicate with various organizations, such as pharmacies, specialists, hospitals, insurance companies, etc. The action items may include any actions that have been performed and/or are to be performed on the medical members, such as physicals, X-rays, surgeries, follow-ups, prescriptions, etc. As information related to a specific medical member can be updated and/or interchanged among the various organizations, the data management 124 can receive information from the various organizations, including but not limited to: actions items, contacts, care events, etc. As another example, if the system 120 is to manage universities in a given state, the data management engine 124 can communicate with various organizations, such as colleges, research groups, etc. The action items may include any actions that are related to the universities, such as lectures, experiments, etc. The data management engine 124 can update, categorize, store, and/or map the information in the individual database based on the communications with the various organizations.

The information of the individual in the individual database may be mapped to each other. As one example, a primary contact information item may include information associated with a secondary contact as a source of a primary contact in the primary contact information item. As another example, a call history item may list one or more primary contacts and/or secondary contacts as a way of commutation associated with the call history item. As the user interacts with the system 120 via one or more interactive user interfaces generated by the UI management engine 128, the data management engine 124 may update the individual database to indicate such user interaction. The data management engine 124, advantageously in some embodiments, can generate and transmit notices back to the data sources A 110a to N 110n if there are changes in the secondary contact information items and/or primary contact information items. In some examples, the system 120 can send a notice to the user on the user device 130. The system 120 can also instruct the UI management engine 128 to generate an individual list including each individual in the system.

Example Authentication Engine

In the example of FIG. 1, the system 120 includes an authentication engine 126. The authentication engine 126 can compute the uniform format data items, initiate a communication with the individual via a primary contact and/or a secondary contact, and update action items of the individual based at least on user inputs. The authentication engine 126 can initiate a communication mechanism, such as a connected device and/or application for the user to communicate with the individual. The device and/or application may include a telephone, an email application, a mail delivery system, etc. In the example of a telephone, the authentication engine 126 can initiate a phone call via a telephone with the individual without any further user action on the telephone.

In some embodiments, if there is no primary contact associated with an individual and/or the user wishes to obtain a new primary contact of the individual, the system 120 can receive a user input selecting a secondary contact information item and the authentication engine 126 can initiate a communication mechanism for the user to contact the secondary contact. As the user makes contact with the secondary contact via the communication mechanism, the authentication engine 126 can instruct the UI management engine 128 to update the interactive user interface for the user to input a newly obtained primary contact information item. As the system 120 receives such user inputs, the authentication engine 126 can instruct the data management engine 124 to update the information in the individual database, including but not limited to call history and action items. In the example of medical member use case, if the user calls the individual's pharmacy and gets a primary contact (e.g. a phone number) of the individual, the system 120 can update the list of secondary contact information items to reflect the call, the system 120 can update the list of call history items to include the call, and the system 120 can update the list of primary contact information items to include the newly obtained primary contact of the individual.

The system 120 can receive a user input to contact the individual via a primary contact. The authentication engine 126 can initiate a communication mechanism to contact the individual via the primary contact as described above. As the user makes contact with the individual via the communication mechanism, the authentication engine 126 can instruct the UI management engine 128 to generate an interactive user interface for the user to validate a primary contact information item and/or update an action item update. As the system 120 receives such user inputs, the authentication engine 126 can instruct the data management engine 124 to update the individual information in the individual database, including but not limited to call history and action items. For example, the system 120 can update the list of primary contact information items to indicate a validation status of the primary contact which is used to contact the individual by the user, the list of action items to reflect the action item update, and any other information related to the communication between the user and the individual.

For users of the system 120, the system 120 in some embodiments can generate a list of action items of individuals to be performed by each user. One or more individuals may be associated with one or more users. Various users may perform an action item associated with a single individual. To avoid multiple users may contact the individual for the same action item at the same time, the system 120 advantageously in some embodiments may generate a queue of action items for each user. As a first user is working on an action item associated with an individual of his queue, the system 120 may flag the action item associated with the individual and/or the individual in the individual database. So as a second user tries to work on the same action item and/or the individual of her queue, the authentication engine 126 may instruct the UI management engine 128 to update the interactive user interface on the second user's device to indicate the first user is working on the same individual and/or same action item. As the first user finishes his actions, the system 120 can then un-flag the action item and/or the individual.

Example UI Management Engine

The system 120, in the example of FIG. 1, includes a UI management engine 128. The UI management engine 128 can generate an interactive user interface for the user on the user device 130, where the interactive user interface can display information on the user device 130. The UI management engine 128 can also receive inputs from the user to obtain and/or authenticate primary contacts and/or update action items. Based at least on the received inputs, the system 120 can instruct the authentication engine 126 to initiate a communication mechanism and the UI management engine 128 can advantageously update the interactive user interface on the user device 130 to receive further user inputs.

Figure 3:
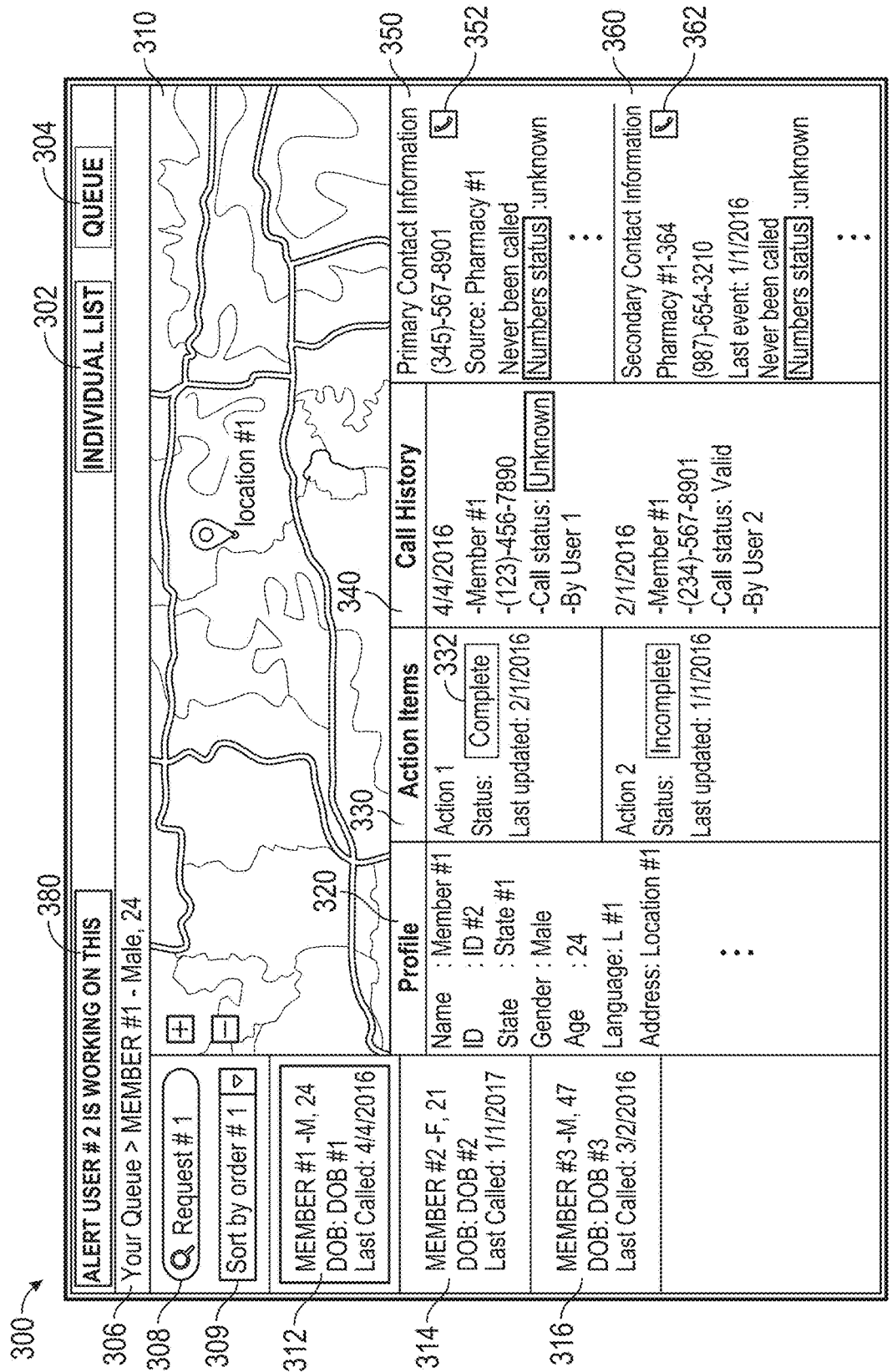

The UI management engine 128, in some embodiments, may generate one or more portions on the interactive user interface for receiving, displaying, and/or updating the list of profile information, the list of call history, and/or any other information. In the examples of FIGS. 3 and. 4A-4B, the UI management engine 128 can generate the following portions on the interactive user interface: one for displaying profile information, one for the list of action items information, one for displaying call history information, one for displaying primary contact information items, one for displaying secondary contact information items, and one or more for receiving user inputs regarding primary contact information item, primary contact authentication, and/or action items updates. In other examples, the UI management engine 128 can generate and/or display more or fewer portions for displaying more or less information and/or receiving user inputs.

The UI management engine 128 can, based on user inputs, add, delete, update, and/or edit one or more user interface elements on the interactive user interface. For example, the UI management engine 128 can generate a UI element for adding, deleting, and/or updating the action items of the individual. The user, using the UI element, can add one or more UI elements to customize the interactive user interface. The UI elements may have different formats, such as calendar, drop box, etc. More details of the UI management engine 128 will be discussed with references to FIGS. 3 and 4A-4B.

Additional Example Implementations of the Integrated Data Authentication System

In an implementation the system 120 (or one or more aspects of the system 120) may comprise, or be implemented in, a "virtual computing environment". As used herein, the term "virtual computing environment" should be construed broadly to include, for example, computer readable program instructions executed by one or more processors (e.g., as described below in the example of FIG. 6) to implement one or more aspects of the modules and/or functionality described herein. Further, in this implementation, one or more modules/engines/etc. (e.g., data management engine 124, authentication engine 126, and/or UI management engine 128) of the system 120 may be understood as comprising one or more rules engines of the virtual computing environment that, in response to inputs received by the virtual computing environment, execute rules and/or other program instructions to modify operation of the virtual computing environment. For example, a request received from the user device(s) 130 may be understood as modifying operation of the virtual computing environment to cause the data management engine 124 to gather data associated with the request, the authentication engine 126 to automatically generate scheduled, and the UI management engine 128 to generate interactive user interfaces. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the data management engine 124 and/or responses received and analyzed via the UI management engine 128 and/or the authentication engine 126. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system 120 as a virtual computing environment may advantageously enable executing different aspects or modules of the system on different computing devices or processors, which may increase the scalability of the system. Implementing one or more aspects of the system 120 as a virtual computing environment may further advantageously enable sandboxing various aspects, data, or modules of the system from one another, which may increase security of the system by preventing, e.g., malicious intrusion into the system from spreading. Implementing one or more aspects of the system 120 as a virtual computing environment may further advantageously enable parallel execution of various aspects or modules of the system, which may increase the scalability of the system. Implementing one or more aspects of the system 120 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Example Primary Contact Obtaining Process

Figure 2A:
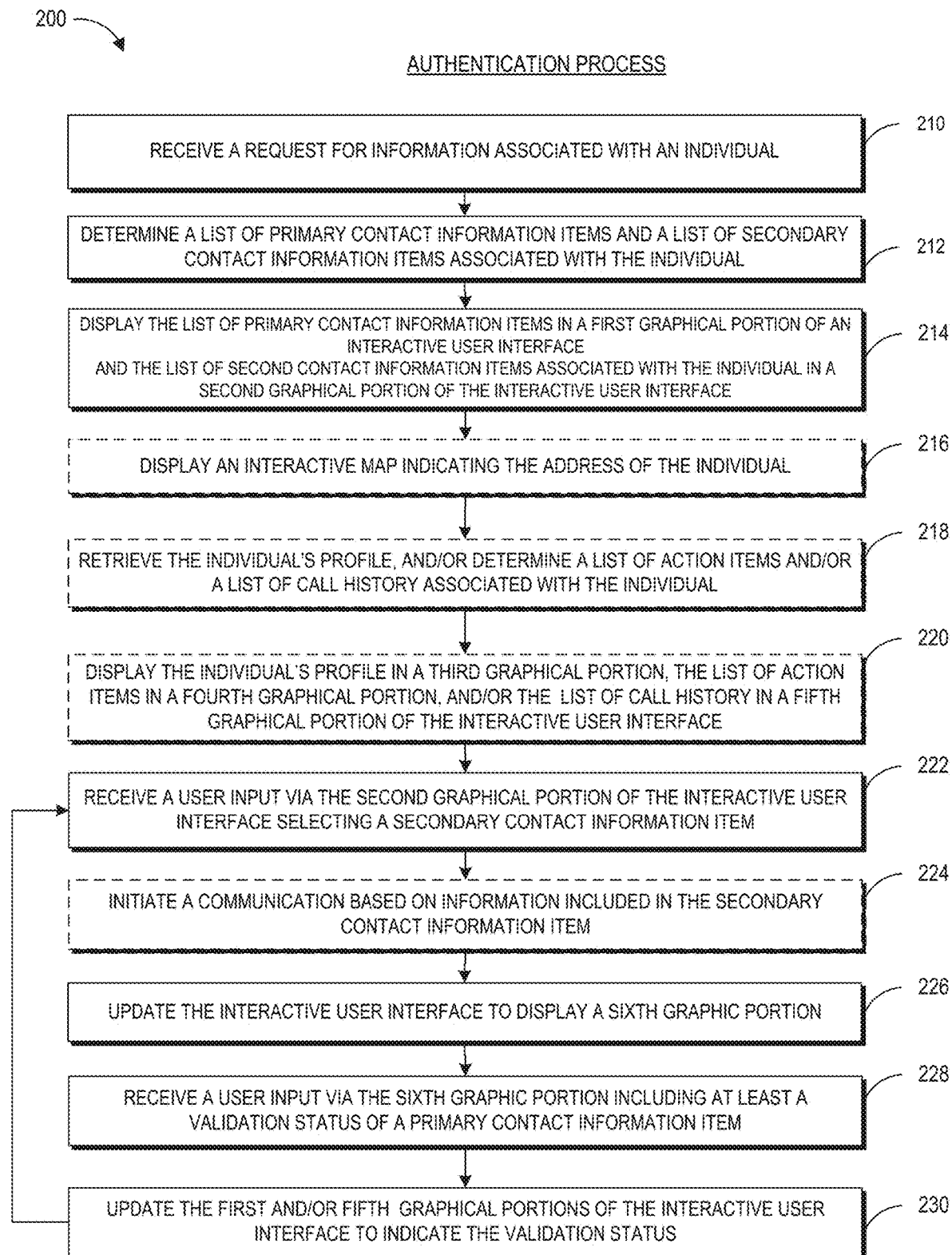
FIG. 2A is a flow chart illustrating an example process of obtaining a new primary contact information item, according to an embodiment of the present disclosure.

FIG. 2A is a flow chart illustrating an example process 200 of obtaining a new primary contact information item, according to an embodiment of the present disclosure. In various embodiments, fewer blocks or additional blocks may be included in the process of FIG. 2A, or various blocks may be performed in an order different from that shown in the FIG. 1n various implementations, the block of FIG. 2A may be performed serially and/or concurrently, and may be performed multiple times simultaneously. Further, one or more blocks in the FIG. 2A may be performed by various components of the system 120, for example, the authentication engine 126 (described above in reference to FIG. 1).

At block 210, the system 120 begins its process by receiving a request for information associated with an individual. Examples of a request can include any information related to the individual, including but not limited to a name, an ID, a date of birth, etc. In some embodiments, the request can be input by the user on an interactive user interface generated by the UI management engine 128. Additionally, the inputted request may vary from user to user as users can define specific request formats by communicating with the UI management engine 128.

At block 212, as the system 120 receives the request, the system 120 can retrieve a list of primary contact information items and a list of secondary contact information items from the individual database. As discussed with reference to FIG. 1, the list of primary contact information items in the individual database may include one or more primary contacts, secondary contact sources associated with the one or more primary contacts, calling histories associated with the primary contacts, validation statuses of the primary contacts, and any other information related to the one or more primary contact information items. The list of secondary contact information items in the individual database may include one or more secondary source contacts, groups associated with the one or more secondary source contacts, last events associated with the secondary contacts, statuses of the secondary contacts, and any other information associated with the one or more secondary contacts. The secondary contact source may include any organizations or persons that may have the individual's primary contact information items. The secondary contact source may have access to the individual's primary contact information items through its daily business and/or connections with the individual.

At block 214, the system 120 can generate an interactive user interface on the user device 130 displaying the list of primary contact information items and the list of secondary contact information items in two portions. At optional block 216, the system 120 can update the user interface to display an address of the individual in an interactive map. In some embodiments, the system 120 can also update the interactive map to include one or more addresses associated with the list of secondary contact information items. At option block 218, the system 120 can retrieve the individual's profile information, a list of action items and/or a list of call history items associated with the individual in the individual database. As discussed in details with reference to FIG. 1, such information may be periodically transmitted to the system 120 to improve computation efficiency. At optional block 220, the system 120 can update the interactive user interface to display the profile information, the list of action items, and/or the list of call history items in a third, fourth, and/or fifth portion of the interactive user interface.

At optional block 222, the system 120 receives a user input in the second portion of the interactive user interface selecting a secondary contact information item. As an example, the user input click on a secondary contact of the secondary contact information items. In some embodiments, the system 120 can provide the user with specific user interface elements for selecting the secondary contact as described with reference to FIG. 3.

As the user selects the secondary contact information item, the system 120 can, at optional block 224, initiate a communication mechanism to contact the secondary contact. A secondary contact information item may include one or more secondary contacts of the secondary contact. The system 120 can based on the user input initiate a corresponding communication mechanism. As an example, if a secondary contact information item includes an email address and a phone number of the secondary and the user selects the phone number, the system 120 can initiate a phone call via a telephone. On the other side, if the user selects the email address, the system 120 can initiate an email application for the user to send an email to the secondary source.

At block 226, the system 120 can update the interactive user interface to display a sixth portion. The system 120 can receive various user inputs regarding the communication between the user and the secondary contact via the sixth portion at block 268. As one example, the system 120 can receive a new primary contact information item of the individual as the user obtains the new primary contact information from the secondary contact. As another example, the system 120 can receive an event performed by the secondary contact that has not been updated in the individual database. The system 120 can then update the individual database accordingly based on the user input.

At block 230, the system 120 can update the first, fourth and/or fifth portions of the user interface to reflect the user interactions with the secondary contact. In the example of the new primary contact information item, the system 120 can update the interactive user interface to include the newly added primary contact information item. In the example of the event performed by the secondary contact, the system 120 can update the interactive user interface to update the list of action items in the fourth portion. The system 120 can then loop back to the block 222 as it receives further user inputs.

Advantageously in some embodiments, the system 120 can automatically access data items stored in various data formats from the various data sources, reformat the data items into uniform format data items, and compute the uniform format data items for various purposes. Advantageously in some embodiments, the system 120 can automatically initiate a communication mechanism for the user in an efficient way. The system 120 can generate an interactive user interface to display various information for the users based at least on a computation of the retrieved data items and receive user inputs.

Example Authentication Process

Figure 2B:
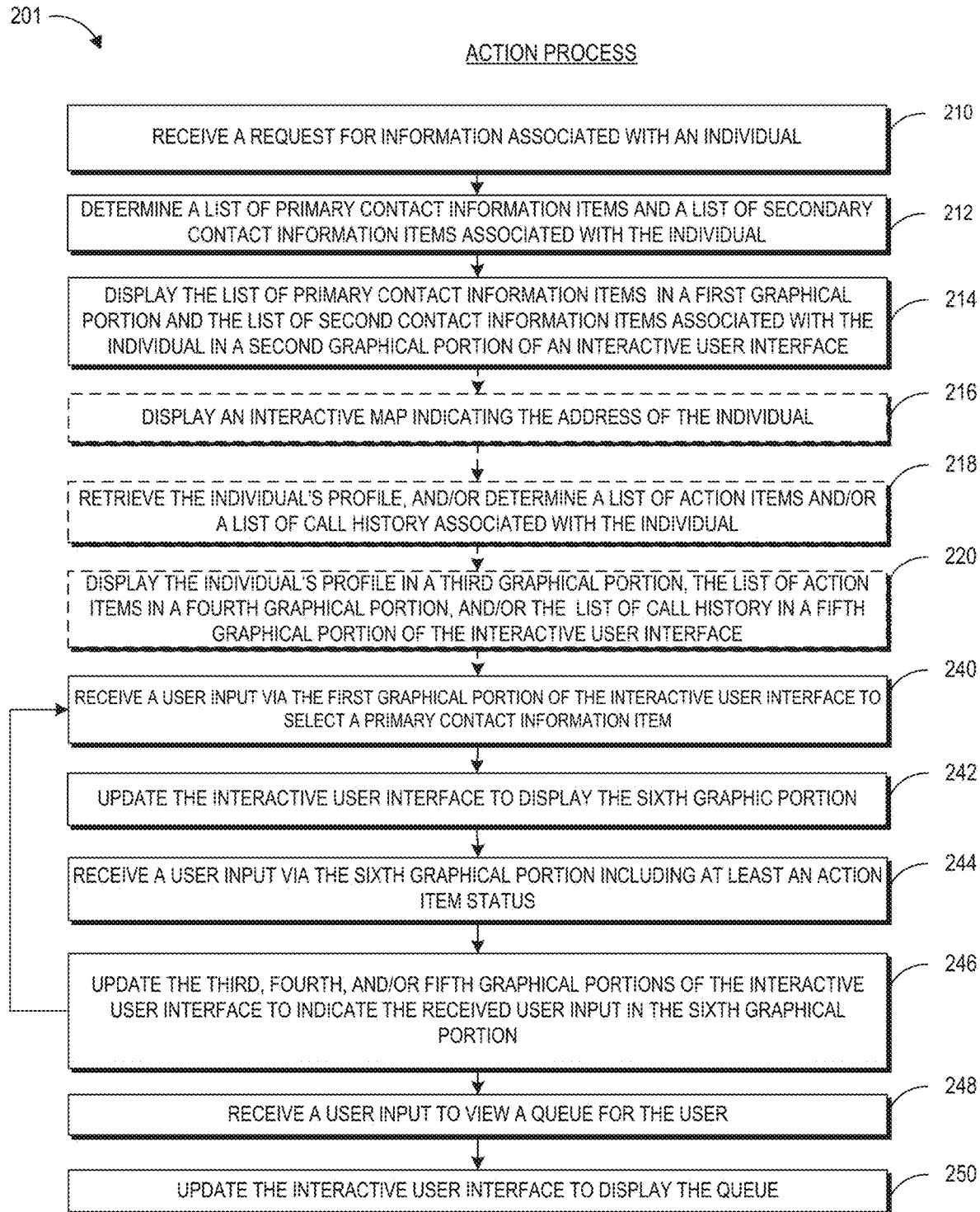
FIG. 2B is a flow chart illustrating an example process of authenticating a primary contact information item, according to an embodiment of the present disclosure.

FIG. 2B is a flow chart illustrating an example process 201 of authenticating a primary contact, according to an embodiment of the present disclosure. In various embodiments, fewer blocks or additional blocks may be included in the process of FIG. 2B, or various blocks may be performed in an order different from that shown in the FIG. 2B. In various implementations, the block of FIG. 2B may be performed serially and/or concurrently, and may be performed multiple times simultaneously. Further, one or more blocks in the FIG. 2B may be performed by various components of the system 120, for example, the authentication engine 126 (described above in reference to FIG. 1).

At block 210, the system 120 begins its process by receiving a request for information associated with an individual. Examples of a request can include any information related to the individual, including but not limited to a name, an ID, a date of birth, etc. In some embodiments, the request can be input by the user on an interactive user interface generated by the UI management engine 128. Additionally, the inputted request may vary from user to user as users can define specific request formats by communicating with the UI management engine 128.

At block 212, as the system 120 receives the request, the system 120 can retrieve a list of primary contact information items and a list of secondary contact information items from the individual database. As discussed with reference to FIG. 1, the list of primary contact information items in the individual database may include one or more primary contacts, secondary contact sources associated with the one or more primary contacts, calling histories associated with the primary contacts, validation statuses of the primary contacts, and any other information related to the one or more primary contact information items. The list of secondary contact information items in the individual database may include one or more secondary source contacts, groups associated with the one or more secondary source contacts, last events associated with the secondary contacts, statuses of the secondary contacts, and any other information associated with the one or more secondary contacts. The secondary contact source may include any organizations or persons that may have the individual's primary contact information items. The secondary contact source may have access to the individual's primary contact information items through its daily business and/or connections with the individual.

At block 214, the system 120 can generate an interactive user interface on the user device 130 displaying the list of primary contact information items and the list of secondary contact information items in two portions. At optional block 216, the system 120 can update the user interface to display an address of the individual in an interactive map. In some embodiments, the system 120 can also update the interactive map to include one or more addresses associated with the list of secondary contact information items. At option block 218, the system 120 can retrieve the individual's profile information, a list of action items and/or a list of call history items associated with the individual in the individual database. As discussed in details with reference to FIG. 1, such information may be periodically transmitted to the system 120 to improve computation efficiency. At optional block 220, the system 120 can update the interactive user interface to display the profile information, the list of action items, and/or the list of call history items in a third, fourth, and/or fifth portion of the interactive user interface.

At block 240, the system 120 receives a user input in the first portion of the interactive user interface. As one example, the user clicks a primary contact of the primary contact information item. In some embodiments, the system 120 can provide the user with specific user interface elements for selecting the primary contact.

As the user selects the primary contact, the system 120 can, at optional block 224, initiate a communication mechanism to contact the individual. A primary contact information item may include one or more primary contacts of the individual. The system 120 can, based on the user input, initiate a corresponding communication mechanism. As an example, if the primary contact information item includes an email address and a phone number of the individual and the user selects the phone number, the system 120 can initiate a phone call using the phone number via a telephone. If the user selects the email address, the system 120 can initiate an email application for the user to send an email to the individual.

At block 242, the system 120 can update the interactive user interface to display a sixth portion. The system 120 can receive various user inputs regarding the communication between the user and the individual via the sixth portion at block 244. As one example, the system 120 can receive a validation status of the selected primary contact as the user communicates with the individual. As another example, the system 120 can receive updates regarding an action item performed by the user during the communication. The system 120 can then update the individual database accordingly based on the user input.

At block 246, the system 120 can update the first, fourth, fourth and/or fifth portions of the user interface to reflect the user's interaction with the primary contact. In the example of the primary contact information item validation, the system 120 can update the first and fifth portions of the interactive user interface to reflect the call and/or the status of the primary contact information item. In the example of the action item performed by the user, the system 120 can update the interactive user interface to update the action item in the fourth portion.

Advantageously in some embodiments, the system 120 can automatically access data items stored in various data formats from the various data sources, reformat the data items into uniform format data items, and compute the uniform format data items for various purposes. Advantageously in some embodiments, the system 120 can automatically initiate a communication mechanism for the user in an efficient way. The system 120 can generate an interactive user interface to display various information for the users based at least on a computation of the retrieved data items and receive user inputs.

Example User Interfaces

FIGS. 3 and 4A-4D illustrate example interactive user interfaces displaying a various individual information to a user, according to various embodiments, in which individual information is collected, analyzed and/or computed and, based on the analysis and/or computation.

In the example of FIG. 3, an interactive user interface 300 includes the following portions of the interactive user interface: one for displaying profile information, one for action items information, one for displaying call history information, one for displaying primary contact information items, one for display secondary contact information items and one for receive user inputs regarding primary contact information item, primary contact authentication, and/or action items updates. In other examples, the UI management engine 128 can generate and/or display more or fewer portions and/or UI elements for displaying more or less information and/or receiving inputs from users.

The system 120 can generate the interactive user interface 300 on the user device 130. The user can click a button 302 "individual list" to view a list of individuals which the user has access to in the individual database. The system 120 can generate a pop-up UI element displaying the list. The list may include some or all information related to the individuals. The user can also click a button 304 "queue" to view his queue. His queue may contain a list of action items associated with one or more individuals to be performed by him. The queue can also be a list of individuals that the user needs to perform action items on. His queue may also contain a list of primary contact information items he needs to validate. The system 120 can generate a pop-up UI element displaying the queue for the user.

The user can make a request to view information related to an individual in the search box 308. The user can input any information related to the individual, such as a name, a date of birth, an area code, etc. The system 120 can automatically determine one or more individuals based at least on the request and update the interactive user interface 300 to display information related to the one or more individuals in the interactive user interface 300. For example, if the user enters "Request #1" in the search box 308, the system 120 determines there are three individuals: Member #1, Member #2, and Member #3. The system 120 can then display the information related to the three individuals in boxes 312, 314 and 316. In the box 312, the displayed information is Member #1's name, gender, age, date of birth, and last contact. In some embodiments, the system 120 may update the interactive user interface to display more or less information related to each of the one or more individuals. The user can use the drop down box 309 to indicate an order he wants to view the one or more individuals. In the example of FIG. 3, the three individuals are sorted by order #1.

As the user selects Member #1, the box 312 may be highlighted to indicate the selection. The system 120 can automatically update the interactive user interface 300 to indicate in a user interface element 306 that the user selects Member #1 in his queue. If another user, User #2 is working on this action item related to the individual and/or working on the individual, the interactive user interface 300 can include a user interface element 380 to indicate an alert, such as "ALERT USER #2 IS WORKING ON THIS."

Additionally, the system 120 can update the interactive user interface 300 to include one or more of the following portions: a portion 320 displaying profile information related to Member #1, a portion 330 displaying a list of action items related to Member #1, a portion 340 displaying a list of call history items related to Member #1, a portion 350 displaying a list of primary contact information items related to Member #1, a portion 360 displaying a list of secondary contact information items related to Member #1, and an interactive map 310 displaying an address of Member #1. As the user selects another individual, the system 120 can update the interactive user interface to display information related to the other individual.

In the box 320, the system 120 can update the interactive user interface 300 to display profile information related to Member #1. In the example of FIG. 3, the profile information related to Member #1 includes: a name, an ID, a State of Member #1, a gender, an age, a language, an address, etc. The system 120 can update the interactive user interface 300 to display more or less profile information related to Member #1. The system 120 can update the interactive user interface 300 to display an interactive map 310. The interactive map 310 can include an indicator of Member #1's address, such as location #1 in the example of FIG. 3.

The system 120 can update the interactive user interface 300 to display one or more action items performed and/or to be performed by the user and/or other users in the box 330. For example, the box 330 includes information related to two action items: Action 1 and Action 2. Action 1 has a status of "complete" and it was last updated on Feb. 1, 2016 while Action 2 has a status of "incomplete" and was last updated on Jan. 1, 2016. The "incomplete" status may indicate that Action 2 has not been performed yet or Member #1 cannot be reached during last call. The user can make changes to the action items in the box 330 by clicking, for example, a button 332. The system 120 can generate the pop-up user interface for the user to update the action item. The box 330 may also include other detailed information related to the action items. The pop-up user interface may be similar to the ones described in details with reference to FIG. 4A-4D.

The system 120 can update the interactive user interface 300 to display a list of call history items of Member #1 in the box 340. The call history items may correlate to the last update date of the action items as well as the information in the list of primary contact information items and/or the list of secondary contact information items. In the box 304, the list includes two calls with Member #1. The first call was made on Apr. 4, 2016 to the number (123)-456-7890 by user #1 and the call status is unknown. The call status may indicate whether Member #1 can be reached by this phone number. A "valid" status may mean Member #1 can be reached by the phone number while an "unknown" status may mean Member #1 has not been reached by the phone number.

In the box 350, the system 120 can update the interactive user interface 300 to display a list of primary contact information items of Member #1. A primary contact information item may include a primary contact, a source of the primary contact, last call, number status, etc. As the user clicks a button 352 next to the phone number (345)-567-8901, the system 120 can initiate a phone call either via a telephone or an Internet phone call application for the user to call Member #1. If the button 352 is next to an email address, the system 120 can initiate an email application. The system 120 can then generate another interactive user interface portion to the user to receive user inputs, including but not limited to: validating a primary contact, and update an action item. The sixth interactive user interface portion is later described with reference to FIG. 4A-4D.

In the box 360, the system 120 can update the interactive user interface 300 to display a list of secondary contact information items of Member #1. A secondary contact information item may include a secondary contact, a name of the secondary contact, last call, number status, etc. As the user clicks a button 362 next to the phone number (987)-654-3210, the system 120 can initiate a phone call either via a phone device or an Internet phone call application for the user to call Member #1. If the button 362 is next to an email address, the system 120 can initiate an email application. The system 120 can then generate another interactive user interface portion on the user device 130 to receive user inputs, including but not limited to: obtaining a primary contact. The interactive user interface portion is later described with reference to FIG. 4A-4D below. Also, in some embodiments, the system 120 can update the interactive map 310 to indicate locations associated with the selected secondary primary contact information items. Alternatively, the system 120 can update the interactive map 310 to indicate locations associated with each of the secondary contact information items. As the user selects a secondary contact information item, the system 120 can update the interactive map 360 to highlight the location associated with the selected secondary contact information item.

Figures 4C, 4D:
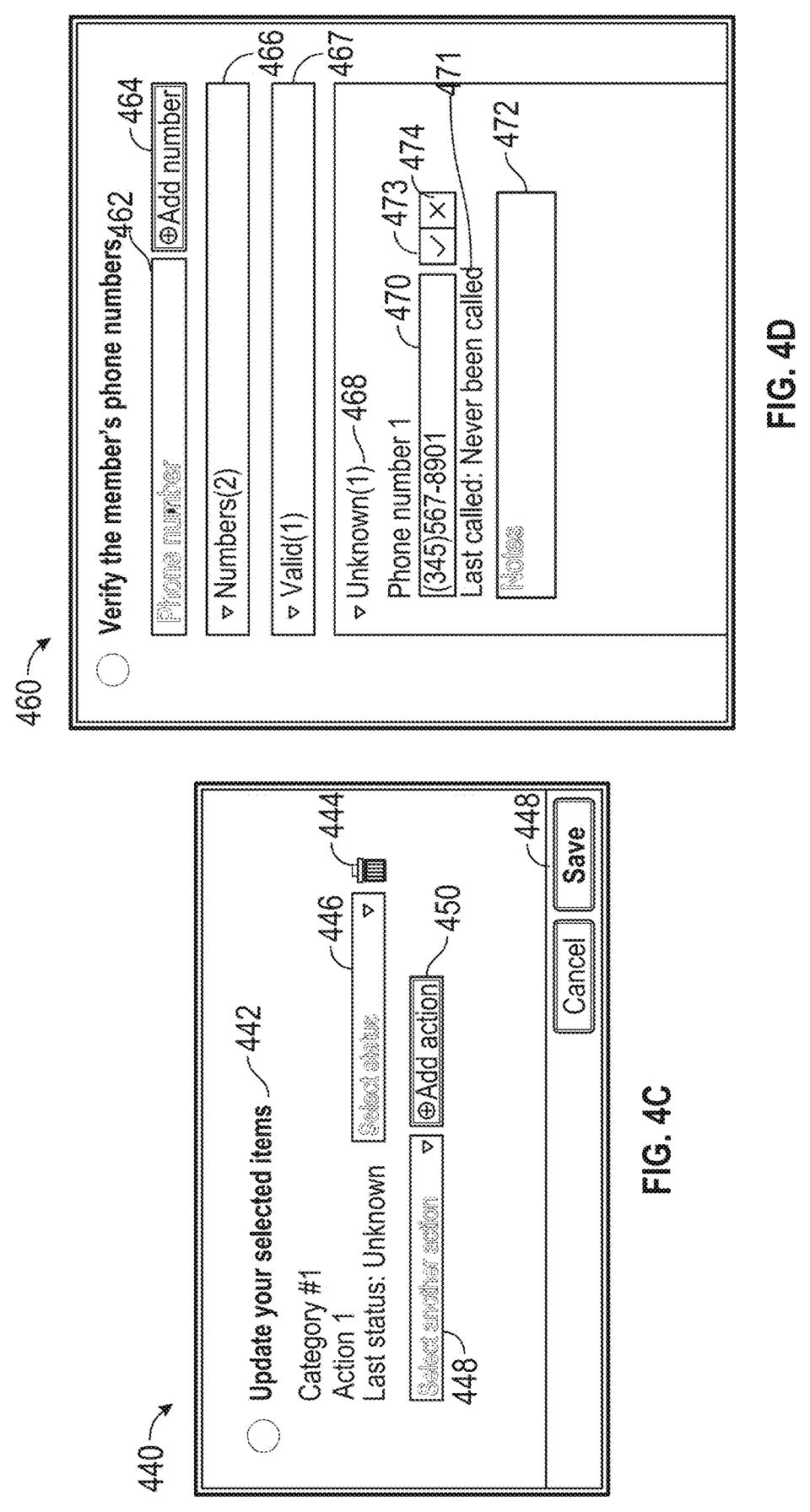

In FIG. 4A-4D, the system 120 can generate another portion of the interactive user interface to receive user inputs. The sixth portion can display a contact form for the user. As shown in FIG. 4A, the user can input call notes in a textbox 401. The UI element 402 can indicate "select the action item you want to address on your call". As shown in FIG. 4A, there are two categories of action items to be updated: Category 1 and Category 2. For Category 1, the user can check Action 1 in a checkbox 404. For Category 2, the user can check Action 2 in a checkbox 406. The user can then update the action item as later discussed with reference to FIG. 4C. In some embodiments, there may be more or fewer categories with more or fewer action items being display depending on the individual information in the individual database. The categories and action items can correspond with the list of action items in the box 340 in FIG. 3. The system can then update the portion 400 to the portion 420 as shown in FIG. 4B as the user clicks a button 408.

In FIG. 4B, the user can input a validation status of a phone call in the sixth portion of the interactive user interface. In the example of FIG. 4B, the phone call is generated by clicking the button 352 in the user interface 300 in FIG. 3 and the phone number (345)567-8901 is shown on the user interface portion 420. The user can input a call status of the phone number in dropdown box 424 and/or input notes in textbox 426. The user can also schedule a follow-up call by clicking a UI element 427. The system 120 can update the portion 420 to the portion 440 as shown in FIG. 4C as the user clicks a button 428.

In FIG. 4C, the user can update the action items he selected in FIG. 4A. The textbox 422 can indicate "update your selected items." The user can update the status of Action 1 in the dropdown box 446. The user can delete an action item by clicking a button 444. The user can add another action item, for example, Action 3 in the dropdown box 448, and click "Add action" button 450. The system can then update the portion 440 to the portion 460 as shown in FIG. 4B as the user clicks a button 452.

In FIG. 4D, the user can add a new primary contact information item in the user interface portion 460. The user can add a new number in a textbox 462 as indicated in FIG. 2AA and click an "add number" button 464, and the system 120 can update the portion 460 to indicate the phone number in a user interface element 466. The user interface element 466 can include one or more phone numbers. The one or more phone numbers may be categorized to two categories: valid and unknown. As the user clicks a user interface element 467, the system 120 can update the portion 460 and display a list of valid phone numbers. Similarly, as the user clicks user interface element 468, the system 120 can update the portion 460 to display a box 469 including unknown status phone number. The unknown status phone can be displayed in textbox 470. The user can indicate the phone number is valid by clicking a UI element 473 and the user can indicate the phone number is not valid by clicking a UI element 474. The system can also indicate a last call in a textbox 471. The user can input notes in a textbox 472.

Even though in the example of FIG. 4A-4B, the user can update action items and/or obtain and/validate a primary contact via a phone number, the process can be completed via texts, emails, and any other methods. Advantageously in some embodiments, as the user clicks button 352 or button 362 in FIG. 3 and the system 120 can initiate a communication mechanism to contact the individual, the system 120 can record a conversation of a phone call, emails, texts, etc. The system 120 can parse through the records and recognize different interactions between the user and the individual and/or the secondary contact, the system 120 can then update action items, obtain and/or validate a primary contact information item without any user input in the user interface portion.

Advantageously in some embodiments, as the user interacts with the various UI elements in the interactive user interface, the system 120 can automatically compute data items and update the interactive user interface to indicate the interaction. The system 120 can collect, reformat, and/or compute data items from the various data sources automatically as the user interacts with the interactive user interface and generate and/or update the interactive user interface to the user automatically. In some embodiments, the user can initiate a device and/or application for the user and the system can update the individual database and/or the interactive user interface based on the user inputs.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
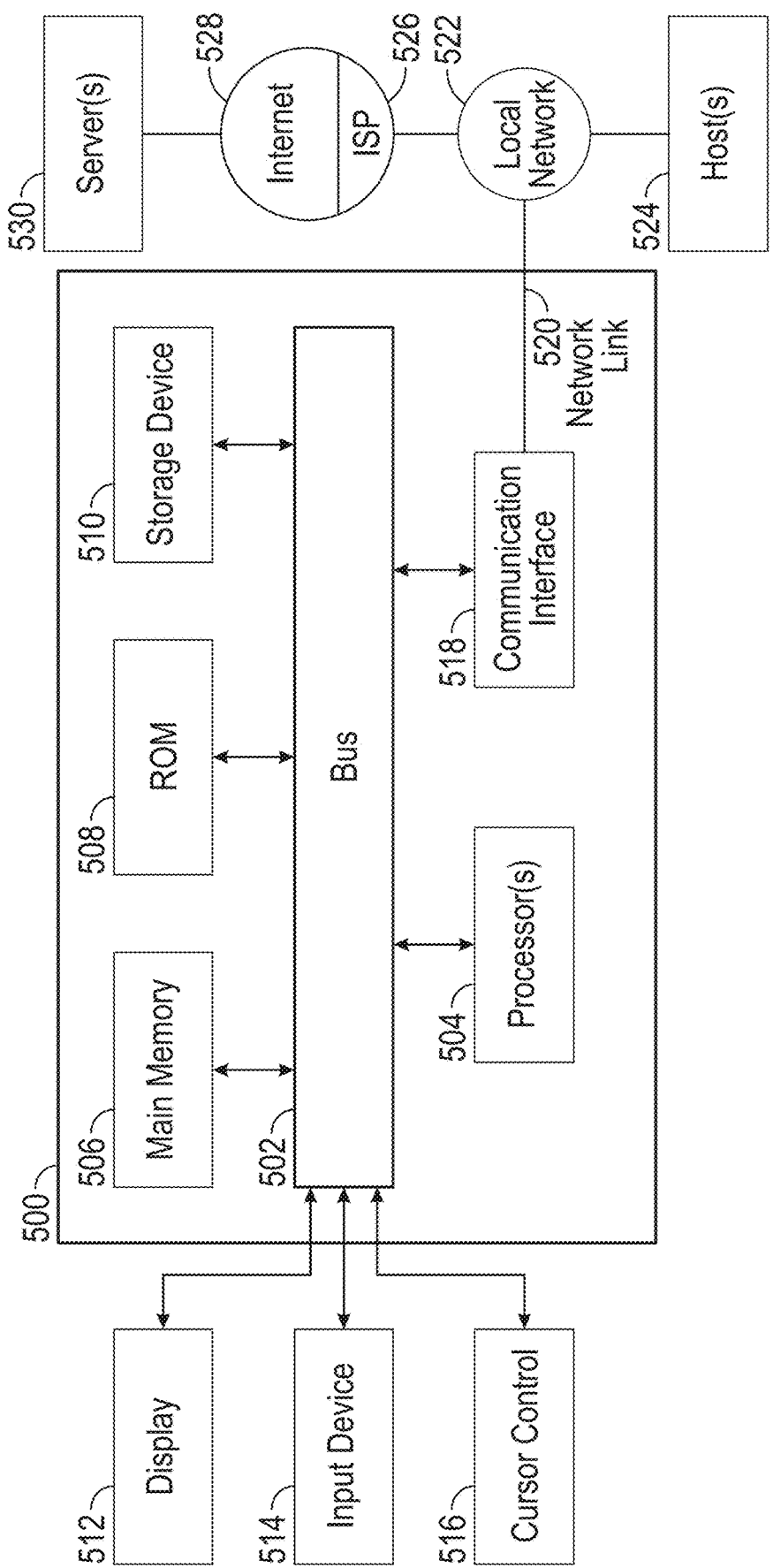
FIG. 5 illustrates a computer system with which certain methods discussed herein may be implemented.

For example, FIG. 5 is a block diagram that illustrates a computer system 500 upon which various embodiments of the system 120 may be implemented. Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

Computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. In some embodiments, the main memory 506 can be the data store 122.

Computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor. Users can use the display 512, the input device 514, and/or the cursor control 516 to view, input, update, and/or change the interactive user interface generated by the system 120.

Computing system 500 may include a user interface module (e.g., the UI management engine 128) to implement a GUI that may be stored in a mass storage device as computer executable program instructions that are executed by the computing device(s). Computer system 500 may further, as described below, implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more computer readable program instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data (e.g., action item data items associated with an individual) on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicate with a WAN). Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 830 might transmit a requested code for an application program through Internet 528, ISP 526, local network 522 and communication interface 518.

The received code may be executed by processor 504 as it is received, and/or stored in storage device 510, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets). In an example embodiment, when configured as monitoring device 150, computer system 800 hosts a web server serving an HTML-based user interface to analysts connecting through a remote device.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
 a computer readable storage medium having embodied thereon program instructions; and one or more processors configured to execute the program instructions to cause the system to:
  generate user interface data configured to be rendered as an interactive user interface including:
    a first graphical portion including a selectable list of primary contact information items associated with an individual;
    a second graphical portion including a selectable list of secondary contact information items associated with the individual; and
  receive a first user input via the second graphical portion of the interactive user interface selecting a secondary contact information item from the list of secondary contact information items;
  in response to the first user input:
    update the interactive user interface to include a third graphical portion configured to receive a second user input including at a new primary contact information item;
    update the primary contact information item to include a new primary contact information item; and
    update the first graphical portion of the interactive user interface to include an indication of the secondary contact information item as a source of the new primary contact information item.

2. The system of claim 1, wherein the one or more processors are further configured to execute the program instructions to cause the system to:
  in response to the first user input, initiate a communication based on information included in the secondary contact information item.

3. The system of claim 1, wherein the one or more processors are further configured to execute the program instructions to cause the system to update the interactive user interface to display a fourth graphical portion including a selectable list of action items associated with the individual.

4. The system of claim 1, wherein the one or more processors are further configured to execute the program instructions to cause the system to update the interactive user interface to display a fifth graphical portion including a selectable list of call history items associated with the individual.

5. The system of claim 4, wherein the one or more processors are further configured to execute the program instructions to cause the system to update the fifth graphical portion of the interactive user interface to display a new call history item associated with the first user input and the secondary primary contact.

6. The system of claim 1, wherein the one or more processors are further configured to execute the program instructions to cause the system to:
  receive a third user input via the first graphical portion of the interactive user interface selecting a primary contact information item from the list of secondary contact information items;
  in response to the third user input:
    update the interactive user interface to include the third graphical portion configured to receive a fourth user input including at a validation status of the primary contact information item; and
    update the primary contact information item to include the validation status.

7. The system of claim 1, wherein the one or more processors are further configured to execute the program instructions to cause the system to generate a first queue for the user including one or more action items to be performed by the user associated with one or more individuals, including the individual.

8. The system of claim 1, wherein the one or more processors are further configured to execute the program instructions to cause the system to:
  generate a second queue for a second user including one or more action items to be performed by the second user with one or more individuals, including the individual.

9. The system of claim 1, wherein the primary contact information item includes at least one of: a number, a secondary contact information item as a source of the primary contact information item, a last contact, a validation status of the primary contact information item.

10. The system of claim 1, wherein the secondary contact information item includes at least one of: a name, a number, a last care event, a status of the secondary primary contact information item.

11. A computer-implemented method for contact authentication and generating interactive user interfaces, comprising:
  by one or more processors executing program instructions:
    generating user interface data configured to be rendered as an interactive user interface including:
      a first graphical portion including a selectable list of primary contact information items associated with an individual;
      a second graphical portion including a selectable list of secondary contact information items associated with the individual; and
    receiving a first user input via the second graphical portion of the interactive user interface selecting a secondary contact information item from the list of secondary contact information items;
    in response to the first user input:
      automatically updating the interactive user interface to include a third graphical portion configured to receive a second user input including at a new primary contact information item;
      automatically updating the primary contact information item to include a new primary contact information item; and
      automatically updating the first graphical portion of the interactive user interface to include an indication of the secondary contact information item as a source of the new primary contact information item.

12. The computer-implemented method of claim 11 further comprising:
  by the one or more processors executing the program instructions:
    in response to the first user input, automatically initiating a communication based on information included in the secondary contact information item.

13. The computer-implemented method of claim 11 further comprising, by the one or more processors executing the program instructions, updating the interactive user interface to display a fourth graphical portion including a selectable list of action items associated with the individual.

14. The computer-implemented method of claim 11 further comprising, by the one or more processors executing the program instructions, updating the interactive user interface to display a fifth graphical portion including a selectable list of call history items associated with the individual.

15. The computer-implemented method of claim 14 further comprising, by the one or more processors executing the program instructions, updating the fifth graphical portion of the interactive user interface to display a new call history item associated with the first user input and the secondary primary contact.

16. The computer-implemented method of claim 11 further comprising:
by the one or more processors executing the program instructions:
receiving a third user input via the first graphical portion of the interactive user interface selecting a primary contact information item from the list of secondary contact information items;
in response to the third user input:
automatically updating the interactive user interface to include the third graphical portion configured to receive a fourth user input including at a validation status of the primary contact information item; and
automatically updating the primary contact information item to include the validation status.

17. The computer-implemented method of claim 11 further comprising, by the one or more processors executing the program instructions, generating a first queue for the user including one or more action items to be performed by the user associated with one or more individuals, including the individual.

18. The computer-implemented method of claim 11 further comprising:
by the one or more processors executing the program instructions:
generating a second queue for a second user including one or more actions to be performed by the second user associated with one or more individuals, including the individual.

19. The computer-implemented method of claim 11, wherein the primary contact information item includes at least one of: a number, a secondary contact information item as a source of the primary contact information item, a last contact, a validation status of the primary contact information item.

20. The computer-implemented method of claim 11, wherein the secondary contact information item includes at least one of: a name, a number, a last care event, a status of the secondary primary contact information item.

* * * * *